(12) United States Patent
Ormiston et al.

(10) Patent No.: US 9,701,341 B2
(45) Date of Patent: Jul. 11, 2017

(54) SPACE FRAME FOR A MACHINE

(71) Applicant: Caterpillar Inc., Peoria, IL (US)

(72) Inventors: Edward Patrick Ormiston, Sullivan, IL (US); David William Holthaus, Monticello, IL (US); Andres Munoz-Najar, Champaign, IL (US); Venkata Rama Varma Dantuluri, Gainesville, FL (US)

(73) Assignee: Caterpillar Inc., Peoria, IL (US)

( * ) Notice: Subject to any disclaimer, the term of this patent is extended or adjusted under 35 U.S.C. 154(b) by 157 days.

(21) Appl. No.: 14/816,239

(22) Filed: Aug. 3, 2015

(65) Prior Publication Data

US 2016/0039463 A1 Feb. 11, 2016

Related U.S. Application Data

(60) Provisional application No. 62/033,163, filed on Aug. 5, 2014.

(51) Int. Cl.
*B60P 1/28* (2006.01)
*B62D 21/08* (2006.01)
*B62D 21/18* (2006.01)

(52) U.S. Cl.
CPC ............ *B62D 21/08* (2013.01); *B60P 1/28* (2013.01); *B62D 21/18* (2013.01)

(58) Field of Classification Search
CPC ............ B60P 1/28; B62D 21/08; B62D 21/18
USPC .................... 298/17 R, 22 R, 22 P; 296/205; 280/781, 785; 52/653.2
See application file for complete search history.

(56) References Cited

U.S. PATENT DOCUMENTS

| 3,977,489 A | 8/1976 | Cole et al. |
| 4,049,309 A | 9/1977 | Seal |
| 4,660,345 A * | 4/1987 | Browning ............. B62D 21/08 164/63 |
| 4,735,355 A | 4/1988 | Browning |

(Continued)

FOREIGN PATENT DOCUMENTS

| CN | 203345077 U | 12/2013 |
| EP | 0808764 A2 | 11/1997 |

(Continued)

OTHER PUBLICATIONS

U.S. Appl. No. 14/645,055 of Rahul N. Gami et al. entitled "Node for a Space Frame" filed on Mar. 11, 2015.

(Continued)

*Primary Examiner* — Stephen Gordon
(74) *Attorney, Agent, or Firm* — Finnegan, Henderson, Farabow, Garrett & Dunner, LLP

(57) ABSTRACT

A space frame for a machine is disclosed. The space frame may have a first end configured to be connected to front wheels of the machine. The space frame may also have a second end configured to be connected to rear wheels of the machine. Further, the space frame may have primary structural members arranged substantially lengthwise between the first end and the second end. In addition, the space frame may have secondary structural members connected between the primary structural members to form substantially triangulated structures allowing the space frame to support a payload to empty vehicle weight ratio ranging from about 1.2:1 to 2:1.

20 Claims, 6 Drawing Sheets

(56) References Cited

U.S. PATENT DOCUMENTS

| | | | |
|---|---|---|---|
| 5,385,391 A | * | 1/1995 | Dickerson ................ B60P 1/16 298/17 R |
| 5,954,364 A | | 9/1999 | Nechushtan |
| 8,240,748 B2 | | 8/2012 | Chapman |
| 8,622,428 B2 | | 1/2014 | Davis et al. |
| 2009/0014993 A1 | | 1/2009 | Tope |
| 2013/0056293 A1 | | 3/2013 | Schurna et al. |

FOREIGN PATENT DOCUMENTS

| | | |
|---|---|---|
| GB | 1349844 | 4/1974 |
| KR | 10-2001-0066512 A | 7/2001 |

OTHER PUBLICATIONS

U.S. Appl. No. 14/645,092 of Rahul N. Gami et al. entitled "Node for a Space Frame" filed on Mar. 11, 2015.

* cited by examiner

SPACE FRAME FOR A MACHINE

CLAIM FOR PRIORITY

This application claims benefit of priority of U.S. Provisional Patent Application No. 62/033,163, filed Aug. 5, 2014, which is incorporated herein by reference.

TECHNICAL FIELD

The present disclosure relates generally to a space frame and, more particularly, to a space frame for a machine.

BACKGROUND

Off-highway load hauling machines, such as mine or quarry trucks, typically include a heavy metallic frame supported at the front and rear by two or more sets of wheels, a truck bed pivotable at the rear end, and an engine to move the truck. Such off-highway machines typically carry very heavy payloads, for example, several tens to hundreds of tons of material such as sand, gravel, mining materials, etc. Further, an off-highway truck typically travels over undeveloped and unpaved roads, which typically do not have a smooth or flat surface. As a result different amounts of ground load may be reacted through the wheels of the truck on different portions of the truck frame.

The frame for an off-highway truck typically consists of heavy gage metal beams and plates welded together and designed to support the weight of the payload and to withstand the torsional and other stresses induced by the uneven ground loads. These structural requirements make the frame heavy. Any prime mover used to move the truck must not only move the weight of the payload, but also the weight of the truck frame. To improve fuel efficiency of the prime mover and reduce the cost of operating such machines, it is desirable to decrease the weight of the machine while improving the machine's ability to carry higher payloads and also withstand the stresses generated during operation.

One attempt to address some of the problems described above is disclosed in U.S. Pat. No. 5,954,364 of Nechushtan that issued on Sep. 21, 1999 ("the '364 patent"). In particular, the '364 patent discloses a space frame for a low profile light truck. The space frame of the '364 patent includes triangulated tubular structural members connected to each other to form a support structure for a passenger compartment. In particular, the '364 patent discloses vehicles using the disclosed space frame for transporting passengers.

Although the '364 patent discloses a space frame for a vehicle, the disclosed system may still be inadequate for off-highway load hauling machines. For example, the system of the '364 patent is directed to vehicles that transport people The system of the '364 patent, however, does not address the problem of carrying payloads that may significantly exceed the machine weight. Further, the space frame disclosed in the '364 patent may not optimally balance the structural loads arising from the payload in comparison to the forces generated by the ground loads of the vehicle.

The space frame of the present disclosure solves one or more of the problems set forth above and/or other problems in the art.

SUMMARY

In one aspect, the present disclosure is directed to a space frame for a machine. The space frame may include a first end configured to be connected to front wheels of the machine. The space frame may further include a second end configured to be connected to rear wheels of the machine. The space frame may also include a plurality of primary structural members arranged substantially lengthwise between the first end and the second end. In addition the space frame may include a plurality of secondary structural members connected between the primary structural members to form substantially triangulated structures. The space frame may be capable of supporting a payload to empty vehicle weight ratio ranging from about 1.2:1 to 2:1.

In another aspect, the present disclosure is directed to a mobile machine. The mobile machine may include a plurality of front wheels and a plurality of rear wheels. The mobile machine may also include a prime mover configured to drive the front wheels and the rear wheels. In addition, the mobile machine may include a space frame configured to support a payload to empty weight ratio ranging from about 1.2:1 to 2:1. The space frame may include a first end connected to the front wheels and a second end connected to the rear wheels. The space frame may also include a plurality of primary structural members arranged substantially lengthwise between the first end and the second end. The space frame may further include a plurality of secondary structural members connected between the primary structural members to form substantially triangulated structures connecting the primary structural members. In addition, the space frame may include a bed pivotably connected to the second end of the space frame, the bed also being movably connected to the first end of the space frame.

DETAILED DESCRIPTION

Figure 1:
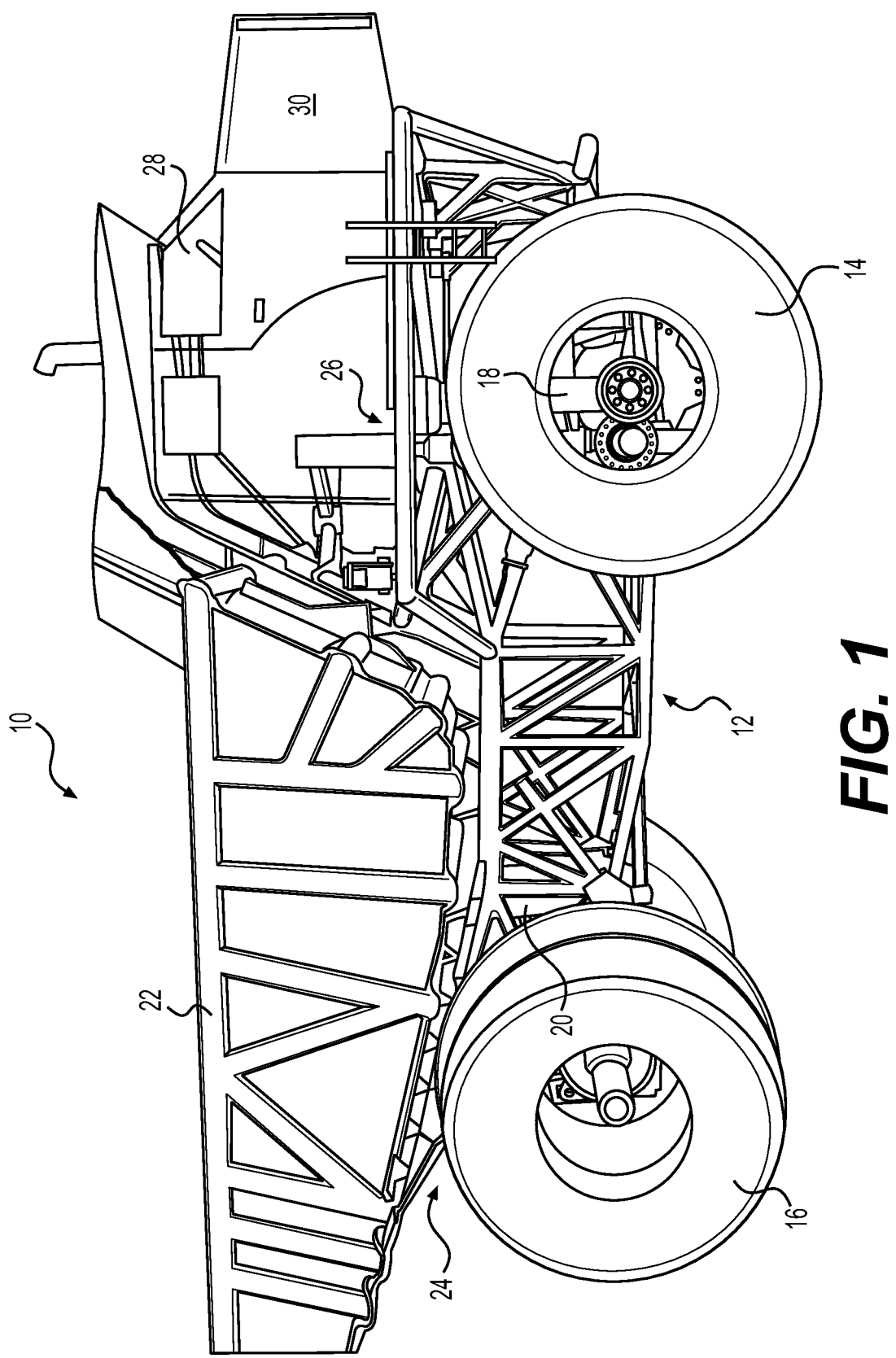
FIG. 1 is a pictorial illustration of an exemplary disclosed machine.

FIG. 1 illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine such as an off-highway mine or quarry truck designed, for example, to haul several tens or hundreds of tons of sand, gravel, dirt, and/or other construction and mining materials, etc. Machine 10 may have a space frame 12 supported by front wheels 14 and rear wheels 16. Front and rear wheels 14, 16 may be connected to space frame 12 by front suspension members 18 and rear suspension members 20, respectively. Machine 10 may also include a bed 22 supported by space frame 12. Bed 22 may be attached pivotably to a rear end 24 of space frame 12. Bed 22 may also be attached movably to a front end 26 of space frame 12. Bed 22 may be configured to be raised at front end 26, while pivoting about rear end 24 to dump the contents of bed 22 on the ground.

Machine 10 may have an operator cabin 28 supported by space frame 12. Additionally, machine 10 may have a prime mover 30 supported by space frame 12. Prime mover 30 may be configured to propel front and rear wheels 14, 16 in the forward or rearward direction. In an exemplary embodiment, as shown in FIG. 1, prime mover 30 may be lengthwise aligned on space frame 12 along a travel direction of machine 10. One skilled in the art will recognize, however, that prime mover 30 may be aligned transversally, or may be located in any other orientation on space frame 12.

In one exemplary embodiment, prime mover 30 may be an internal combustion engine, which may be a two-stroke or four-stroke diesel engine. One skilled in the art will recognize, however, that prime mover 30 may be any other type of internal combustion engine such as, for example, a gasoline engine, or a gaseous fuel-powered engine. Prime mover 30 may be connected to front and/or rear wheels 14, 16 via other components such as a drive train (not shown) to transfer motive power to move front and rear wheels 14, 16 in a forward or rearward direction. Machine 10 may also be equipped with a steering mechanism (not shown) and controls (not shown) to move machine 10 and/or raise or lower bed 22. The steering mechanism and the controls may be located within operator cabin 28 of machine 10.

Figure 2:
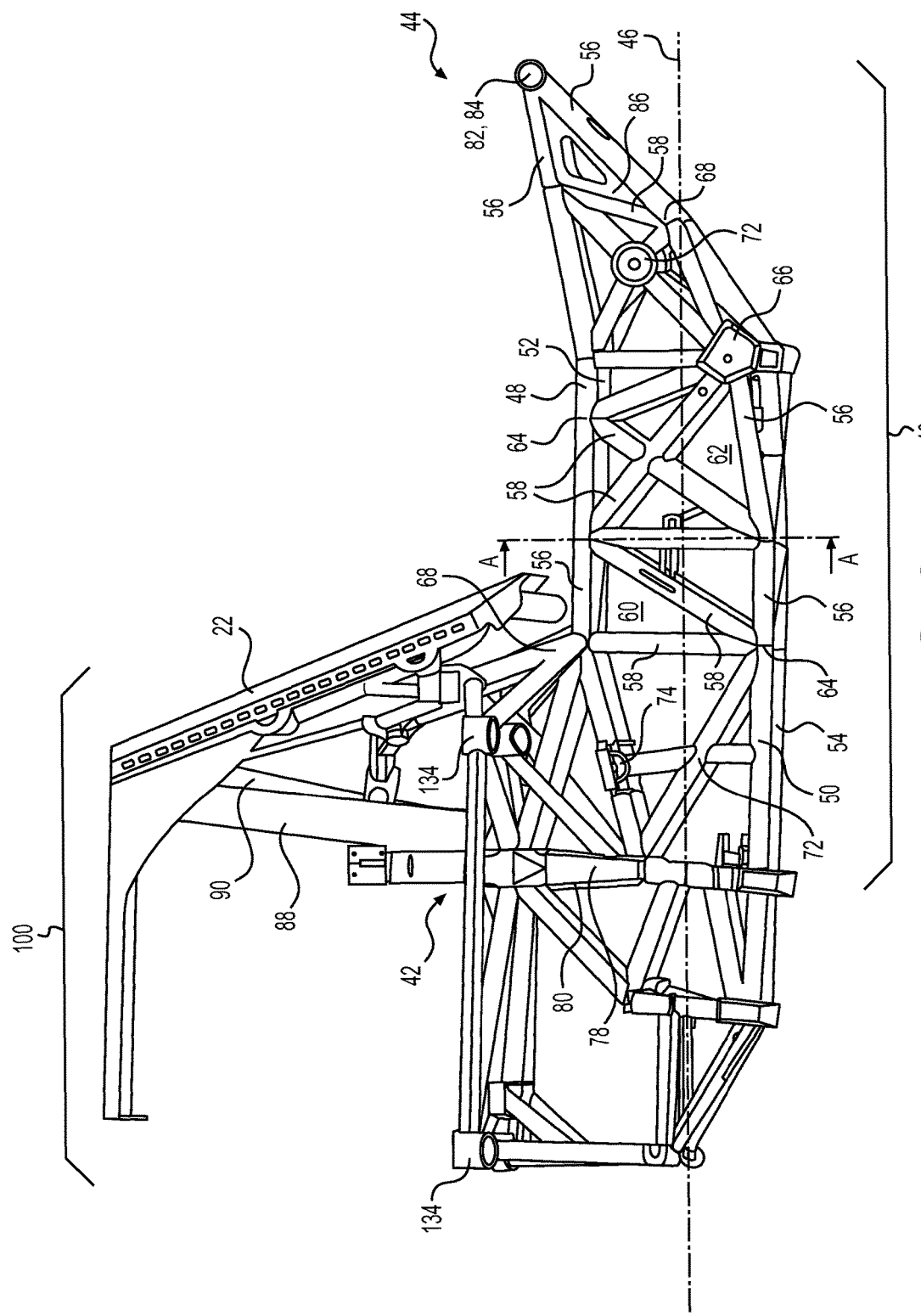
FIG. 2 is a pictorial illustration of a side-view of an exemplary disclosed space frame for the machine of FIG. 1.

FIG. 2 illustrates a view of an exemplary disclosed space frame 12 for machine 10 as seen from a side of machine 10. As shown in FIG. 2, space frame 12 may include a rear frame portion 40 and a front frame portion 100. Rear frame portion 40 may have a first end 42 and a second end 44. Rear frame portion 40 may extend lengthwise between first end 42 and second end 44 substantially along a longitudinal axis 46 of machine 10. Rear frame portion 40 may have first longitudinal structure 48, second longitudinal structure 50, third longitudinal structure 52, and fourth longitudinal structure 54. Each of first, second, third, and fourth longitudinal structures 48, 50, 52, 54 may have a plurality of primary structural members 56, which may be arranged substantially lengthwise between first end 42 and second end 44. For example, a first set of primary structural members 56 may be connected end-to-end with each other to form first longitudinal structure 48. A second set of primary structural members 56 may be connected end-to-end with each other to form second longitudinal structure 50. A third set of primary structural members 56 may be connected end-to-end with each other to form third longitudinal structure 52. And, a fourth set of primary structural members 56 may be connected end-to-end with each other to form fourth longitudinal structure 54.

Figure 3:
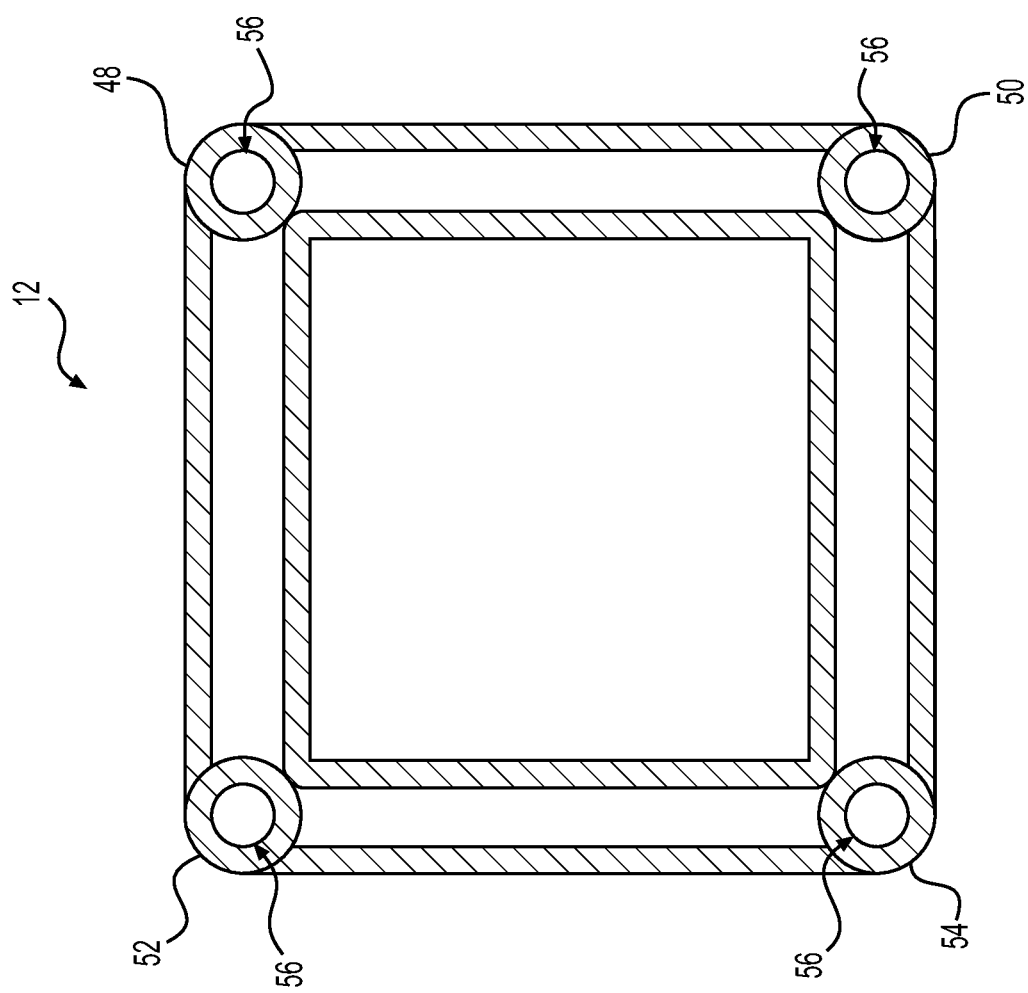
FIG. 3 is a pictorial illustration of a cross-section in a plane orthogonal to a longitudinal axis of the exemplary disclosed space frame of FIG. 2.

FIG. 3 illustrates a cross-sectional view of space frame 12 along line A-A (FIG. 2). As illustrated in FIG. 3, between first end 42 and second end 44, first, second, third, and fourth longitudinal structures 48, 50, 52, 54 may be arranged so as to form a substantially rectangular cross section in a plane orthogonal to longitudinal axis 46 of machine 10.

Returning to FIG. 2, a plurality of secondary structural members 58 may be connected between primary structural members 56 to form substantially triangulated structures. For example, secondary structural members 58 may be connected between primary structural members 56 to form a substantially triangulated structure 60. In one exemplary embodiment, as shown in FIG. 2, secondary structural member 58 may connect between primary structural members 56 and another secondary structural member 58 to form substantially triangulated structure 62. The use of substantially triangulated structures may help to distribute the weight of a payload carried by machine 10 in bed 22 over an entirety of space frame 12. As used in this disclosure, payload refers to the weight of material carried in bed 22 and excludes the weight of passengers or one or more operators of machine 10. The use of triangulated structures may also help generate primarily axial stresses in primary structural members 56 and secondary structural members 58 as a result of the weight of the payload in bed 22 or because of ground loads reacted by front and rear wheels 14, 16 on space frame 12. As further illustrated in FIG. 2, one or more primary structural members 56 may be connected to each other and to one or more secondary structural members 58 at nodes 64. Rear frame portion 40 may include one or more planar nodes 66 or non-planar nodes 68.

Figure 4:
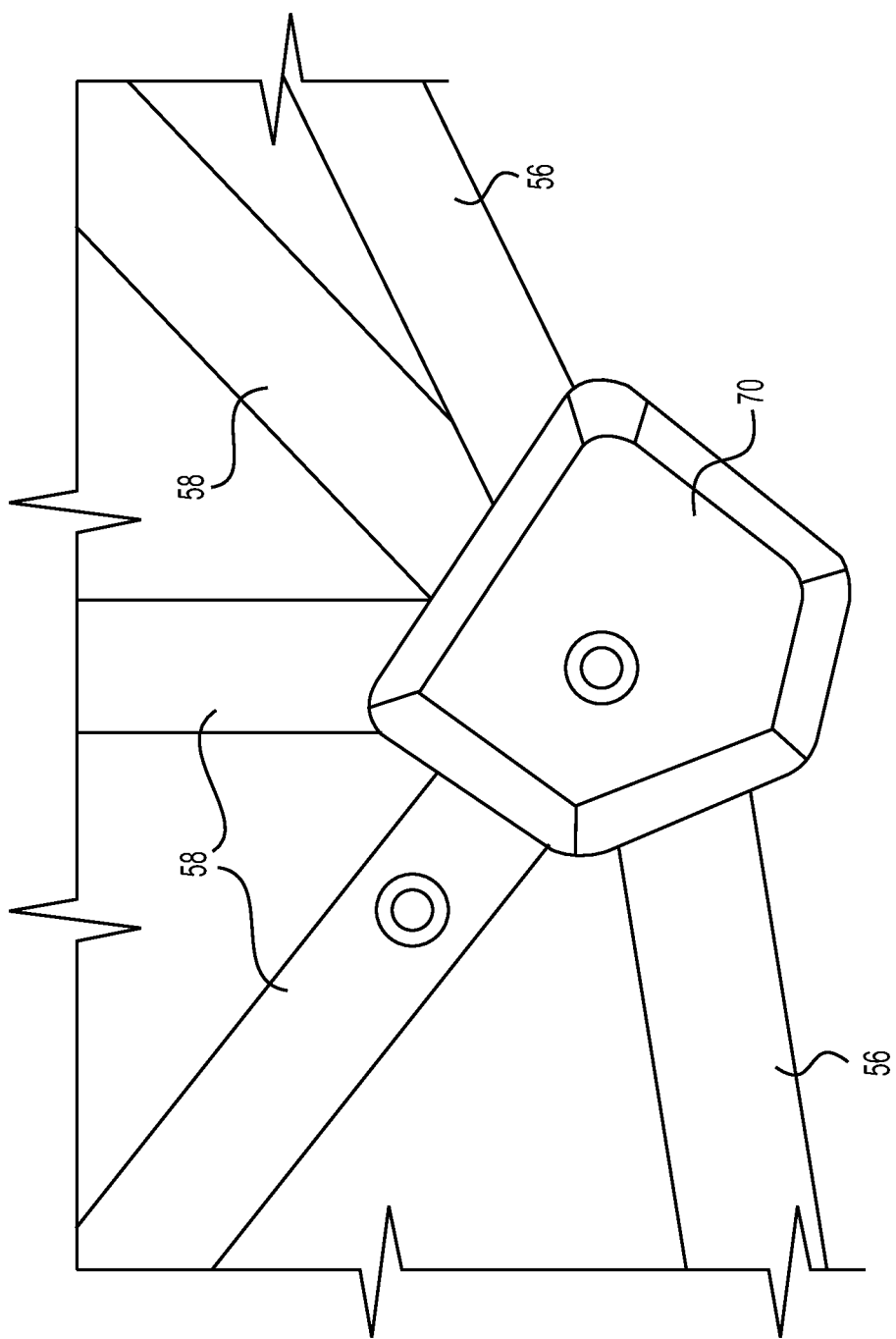
FIG. 4 is a pictorial illustration of an exemplary disclosed planar node of the space frame of FIG. 2.

As illustrated in greater detail in FIG. 4, planar node 66 may connect primary structural members 56 and secondary structural members 58 when primary structural members 56 and secondary structural members 58 lie in one coordinate plane. Planar node 66 may include a connection member 70, which may be configured to connect primary structural members 56 and secondary structural members 58 in one plane while allowing primary structural members 56 and secondary structural members 58 to be oriented in desired angular orientations relative to each other. Connection member 70 may have a triangular, rectangular, polygonal, curvilinear shape, or any other appropriate shape known in the art. Returning to FIG. 2, rear frame portion 40 may have connection member 72, which may have a substantially circular shape and connection member 74, which may have a substantially semicircular shape.

Figure 5:
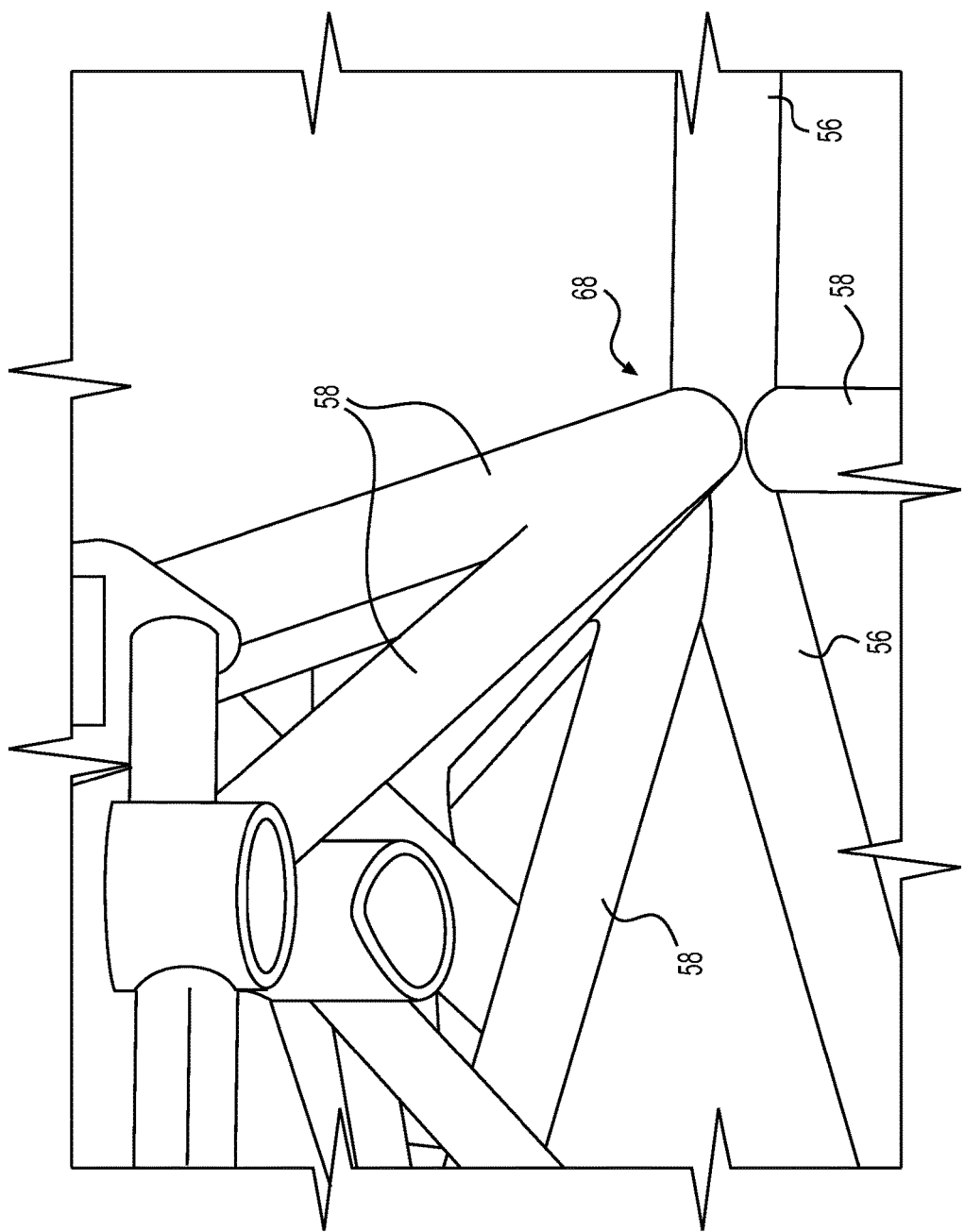
FIG. 5 is a pictorial illustration of an exemplary disclosed non-planar node of the space frame of FIG. 2.

FIG. 5 illustrates a non-planar node 68, which connects primary structural members 56 and secondary structural members 58, when primary structural members 56 and secondary structural members 58 do not lie in one coordinate plane but instead are located in more than one plane.

Returning to FIG. 2, first longitudinal structure 48 and second longitudinal structure 50 may be connected to a first support member 78 at first end 42 of rear frame portion 40. Similarly, third longitudinal structure 52 and fourth longitudinal structure 54 may be connected to second support member 80 at first end 42 of rear frame portion 40. First longitudinal structure 48 and second longitudinal structure 50 may be connected to each other via a first boss 82 at second end 44 of rear frame portion 40. Similarly, third longitudinal structure 52 and fourth longitudinal structure 54 may be connected to each other via a second boss 84 (hidden behind first boss 82) at second end 44 of rear frame portion 40. Thus, first and second longitudinal structures 48 and 50 may form a substantially tapered second end 44. Similarly third and fourth longitudinal structures 52 and 54 may form a substantially tapered second end 44. Substantially triangular planar members 86 may be connected between primary structural members 56, secondary structural member 58, and first boss 82 to form tapered second end 44. A similar triangular planar member 86 may be connected between primary structural members 56 of third and fourth longitudinal structures 52, 54, secondary structural member 58, and second boss 84.

A first hoist 88 and a second hoist 90 may connect bed 22 to first end 42 of rear frame portion 40. First and second hoists 88, 90 may permit bed 22 to be raised or lowered, while pivoting about second end 44 of rear frame portion 40. First and second hoists 88, 90 may be hydraulic actuators, electro-mechanical actuators, or any other type of linear displacement actuators designed to raise or lower bed 22 at first end 42. It is also contemplated that in some exemplary embodiments, first hoist 88 and second hoist 90 may connect bed 22 to front frame portion 100.

Figure 6:
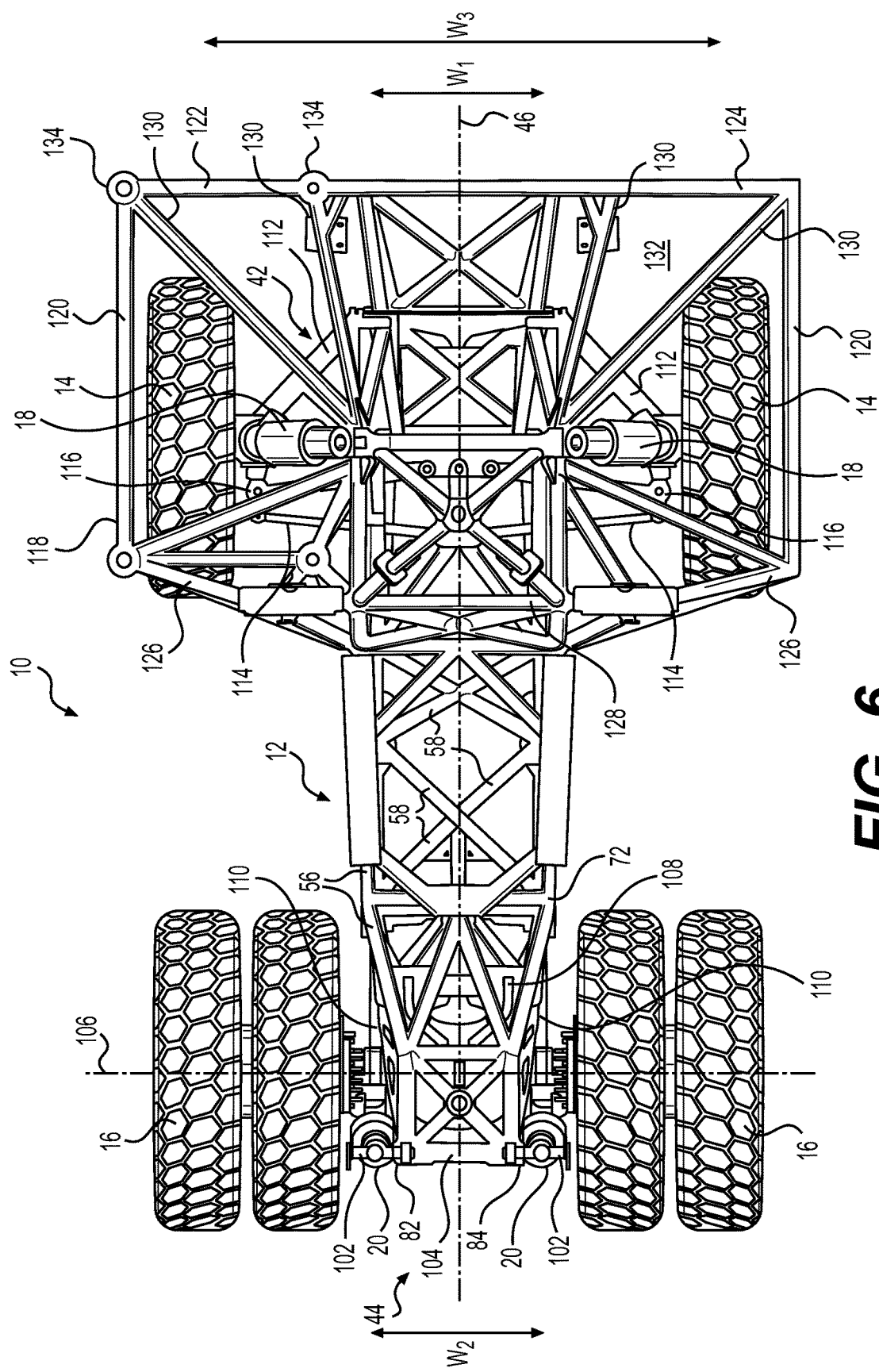
FIG. 6 is pictorial illustration of a top-view of the exemplary disclosed space frame of FIG. 2.

FIG. 6 illustrates another view of space frame 12 for machine 10 as seen from a top of machine 10 looking down towards the ground. As illustrated in FIG. 6, cross-support member 104 may connect first boss 82 and second boss 84. Bed 22 may be pivotably supported by cross support member 104 to allow bed 22 to rotate around a transverse axis 106 oriented substantially orthogonal to longitudinal axis 46 of machine 10. Bearing members 102 may be attached to first and second bosses 82 and 84 at second end 44 of space frame 12. Rear suspension members 20 may connect bearing members 102 to rear wheels 16. Additional rear suspension members 108, 110 may also connect rear frame portion 40 to rear wheels 16. In one exemplary embodiment, bearing members 102 may help connect primary structural members 56, rear suspension members 20, and bed 22. First end 42 of rear frame portion 40 may be connected to front wheels 14 via front suspension members 18. Additional front suspension members 112, 114, 116 may also connect rear frame portion 40 to front wheels 14. In another exemplary embodiment, spherical plain bearing elements may be used to connect one or more of front suspension members 18,20, rear suspension members 108, 110, 112, 114, 116, first, second, third, and fourth longitudinal structures 48, 50, 52, 54, structural members 56, 58, and/or connection members 70, 72, 74. It is contemplated that spherical plain bearing elements may be used at any of the nodes in space frame 12.

Front frame portion 100 may be configured to support operator cabin 28 and/or prime mover 30. As illustrated in FIG. 6, front frame portion 100 may have a substantially rectangular frame 118. Edge members 120, 122, 124, 126, and 128 may be connected together to form substantially rectangular frame 118. Rectangular frame 118 may be oriented so that a plane formed by edge members 120, 122, 124, 126, and 128 may be substantially parallel to a ground surface supporting front wheels 14. As illustrated in FIG. 6, rear frame portion 40 may have a first width "W1" at first end 42 and a second width "W2" at second end 44. In one exemplary embodiment, as illustrated in FIG. 6, second width W2 may be smaller than first width W1. Further, as illustrated in FIG. 6, rectangular frame 118 may have a third width "W3," which may be larger than W1 and W2. Rectangular frame 118 may be connected to first end 42 of rear frame portion 40 via secondary structural members 130, which may form substantially triangulated structures. For example, edge member 124, and secondary structural members 130 may form substantially triangulated structure 132. Edge members 120, 122, 124, 126, 128 and/or secondary structural members 130 may be connected to each other via nodes 134. In one exemplary embodiment, as illustrated in FIG. 2, nodes 134 may have a cylindrical shape.

Primary structural members 56, secondary structural members 58, 130, edge members 120, 122, 124, 126, 128, first and second support members 78, 80, and cross-support member 104 of space frame 12 may be tubular or solid bars or beams, which may have a circular, elliptical, triangular, square, polygonal, I-shaped, or any other type of cross-section known in the art. Primary structural members 56, secondary structural members 58, 130, edge members 120, 122, 124, 126, 128, first and second support members 78, 80, and cross-support member 104 may be made of metal, metal alloys, reinforced composite materials, or any other type of structural material known in the art. Primary structural members 56, secondary structural members 58, 130, edge members 120, 122, 124, 126, 128, first and second support members 78, 80, and cross-support member 104 may be connected to each other and/or to nodes 64, 66, 68, 134 by permanent attachment means such as welds or via removable attachment means such as bolts, rivets, etc. The geometric arrangement of primary structural members 56, secondary structural members 58, 130, edge members 120, 122, 124, 126, 128, first and second support members 78, 80, and cross-support member 104 may be configured such that space frame 12 may support a payload to space frame weight ratio of greater than or equal to about 9 to 1. As used in this disclosure, space frame weight refers to a weight of space frame 12 of machine 10. For example, space frame 12 of machine 10 weighing 50 tons may allow machine 10 to haul a payload, not including passengers or the operator of machine 10, of at least about 450 tons of material in bed 22. In another exemplary embodiment, the disclosed space frame may support a payload to empty vehicle weight ratio ranging from about 1.2:1 to 2:1. As used in this disclosure, empty vehicle weight refers to a weight of the machine including space frame 12, front wheels 14, rear wheels 16, bed 22, operator cabin 28, prime mover 30, and any other components, which may be a part of machine 10 but without any additional material in bed 22 of machine 10. High payload to empty vehicle weight ratios may be achieved by directly connecting bed 22 to machine 10 and by transferring vertical loads through front suspension members 18,20 and rear suspension members 108, 110, 112, 114 directly to front and rear wheels 14, 16, without transferring the vertical loads to space frame 12.

INDUSTRIAL APPLICABILITY

The disclosed space frame may be used in any machine where it is beneficial to reduce the weight of the machine, while increasing the payload-carrying capacity of the machine. The disclosed space frame may find particular applicability with mobile machines such as off-highway mining or quarry trucks designed to haul payloads of tens to hundreds of tons. The disclosed space frame may provide a number of advantages in the operation, manufacture, and maintenance of machine 10.

Space frame 12 may provide a substantial reduction in the weight of machine 10. For example, space frame 12 may provide a reduction in weight of the machine frame of about 30% as compared to a conventional machine frame, and a reduction in total weight of machine 10 of about 6 to 9%. The reduced weight afforded by space frame 12 may allow machine 10 to carry a heavier payload for the same amount of fuel consumed by prime mover 30. Alternatively, the lower machine weight may help reduce the fuel consumption of prime mover 30 for any given payload. During operation, the weight of machine 10 and the weight of the payload may be supported by the tires on the front and rear wheels 14, 16 of machine 10. A lower weight of machine 10 may, therefore, help to reduce an amount of wear on the tires of the front and rear wheels 14, 16 thereby improving the durability and useful life of the tires on machine 10.

Space frame 12 may also advantageously allow the machine to haul a payload, nearly three times as heavy as machine 10 itself. The arrangement of primary structural members 56, secondary structural members 58, 130, edge members 120, 122, 124, 126, 128, first and second support members 78, 80, and cross-support member 104 in space frame 12 may provide a direct load path from the payload to the ground. Similarly, the arrangement of the structural members of space frame 12 may allow grounds loads to be directly absorbed by the front and rear suspension members 18, 20, 108, 110, 114, 116 without distributing the ground loads through space frame 12. As a result bending loads and the accompanying torsional stresses on space frame 12 may be reduced further thus helping to reduce the weight of space frame 12. The distribution of stresses generated by the payload and ground loads in space frame 12 may allow machine 10 to haul a payload of at least three times the weight of machine 10.

Space frame 12 may provide additional advantages associated with manufacture of machine 10. For example, space frame 12 may include a number of discrete primary structural members 56, secondary structural members 58, 130, edge members 120, 122, 124, 126, 128, first and second support members 78, 80, cross-support member 104, and nodes 64, 66, 68, 134. As a result, space frame 12 may advantageously reduce the number of large metal castings needed to manufacture space frame 12. Space frame 12 and its constituent structural members may also be subject to wear and tear during operation of machine 10. The modular construction of space frame 12 may allow quicker removal and replacement of any of primary structural members 56, secondary structural members 58, 130, edge members 120, 122, 124, 126, 128, first and second support members 78, 80, cross-support member 104, and nodes 64, 66, 68, 134, thereby reducing the time for which machine 10 must be taken out of service for maintenance.

It will be apparent to those skilled in the art that various modifications and variations can be made to the disclosed space frame without departing from the scope of the disclosure. Other embodiments of the space frame will be apparent to those skilled in the art from consideration of the specification and practice of the space frame disclosed herein. It is intended that the specification and examples be considered as exemplary only, with a true scope of the disclosure being indicated by the following claims and their equivalents.

What is claimed is:

1. A space frame for a machine, comprising:
   a first end configured to be connected to front wheels of the machine;
   a second end configured to be connected to rear wheels of the machine;
   a plurality of the primary structural members arranged substantially lengthwise between the first end and the second end; and
   a plurality of secondary structural members connected between the primary structural members to form substantially triangulated structures, such that the space frame supports a payload to empty vehicle weight ratio ranging from about 1.2:1 to 2:1.

2. The space frame of claim 1, further comprising a plurality of nodes configured to connect one or more primary structural members and one or more secondary structural members.

3. The space frame of claim 1, further including a planar node configured to connect at least one of the primary structural members and one or more of the secondary structural members, the at least one primary structural member and the one or more secondary structural members being located in one plane.

4. The space frame of claim 1, further including a non-planar node configured to connect at least one of the primary structural members and a plurality of the secondary structural members, the at least one primary structural member and the secondary structural members being located in more than one plane.

5. The space frame of claim 1, further including:
   a rear frame portion configured to be connected to the front and rear wheels of the machine; and
   a front frame portion configured to be connected to the rear frame portion.

6. The space frame of claim 5, wherein the rear frame portion includes:
   a first longitudinal structure including a first set of the primary structural members;
   a second longitudinal structure including a second set of the primary structural members;
   a third longitudinal structure including a third set of the primary structural members; and
   a fourth longitudinal structure including a fourth set of the primary structural members, wherein the first, second, third, and fourth longitudinal structures are arranged such that the rear frame portion has a substantially rectangular cross-section in a plane orthogonal to a longitudinal axis of the machine.

7. The space frame of claim 6, wherein the rear frame portion has:
   a first width at the first end; and
   a second width smaller than the first width at the second end.

8. The space frame of claim 7, wherein the front frame portion includes:
   a plurality of the edge members connected to form a substantially rectangular frame; and
   a plurality of secondary structural members configured to connect the rectangular frame to the rear frame portion.

9. The space frame of claim 8, wherein the rectangular frame has a third width greater than the first width and the second width.

10. The space frame of claim 6, further including:
    a first boss connecting the first longitudinal structure and the second longitudinal structure at the second end; and
    a second boss connecting the third longitudinal structure and the fourth longitudinal structure at the second end.

11. The space frame of claim 10, wherein the first boss and the second boss are configured to connect the second end of the space frame to the rear wheels of the machine.

12. The space frame of claim 6, further including:
    a first support member connected to the first longitudinal structure and the second longitudinal structure at the first end; and
    a second support member connected to the third longitudinal structure and the fourth longitudinal structure at the first end, wherein the first and second support members are configured to be connected to the front wheels of the machine.

13. The space frame of claim 1, wherein the primary structural members and the secondary structural members comprise hollow tubular members.

14. The space frame of claim 13, wherein the tubular members have a circular cross-section.

15. The space frame of claim 13, wherein the tubular members have a non-circular cross-section.

16. A mobile machine comprising:
    a plurality of front wheels;
    a plurality of rear wheels;
    a prime mover configured to move the machine; and
    a space frame configured to support a payload to empty vehicle weight ratio ranging from about 1.2:1 to 2:1, the space frame including:
      a first end connected to the front wheels;
      a second end connected to the rear wheels;
      a plurality of primary structural members arranged substantially lengthwise between the first end and the second end; and a plurality of secondary structural members connected between the primary structural members to form substantially triangulated structures connecting the primary structural members; and a bed pivotably connected to the second end of the space frame, the bed also being movably connected to the first end of the space frame.

17. The mobile machine of claim 16, further including:

a rear frame portion configured to be connected to the front and rear wheels; and a front frame portion configured to be connected to the rear frame portion.

18. The mobile machine of claim 17, wherein the front frame portion includes:

a plurality of edge members connected to form a substantially rectangular frame configured to support the prime mover; and a plurality of the secondary structural members connecting the rectangular frame to the rear frame portion.

19. The mobile machine of claim 18, wherein the rear frame portion includes:

a first longitudinal structure including a first set of the primary structural members;

a second longitudinal structure including a second set of the primary structural members;

a third longitudinal structure including a third set of the primary structural members; and a fourth longitudinal structure including a fourth set of the primary structural members, wherein the first, second, third, and fourth longitudinal structures are arranged so as to form a substantially rectangular cross-section in a plane orthogonal to a longitudinal axis of the machine.

20. The mobile machine of claim 19, wherein:

a first support member is connected to the first longitudinal structure and the second longitudinal structure at the first end;

a second support member is connected to the third longitudinal structure and the fourth longitudinal structure at the first end;

a first boss connects the first longitudinal structure and the second longitudinal structure at the second end; and a second boss connects the third longitudinal structure and the fourth longitudinal structure at the second end, and the mobile machine further includes:

front suspension members connected between the first and second support members and the front wheels; and rear suspension members connected between the first and second bosses and the rear wheels.

* * * * *